United States Patent [19]
Rodrigues et al.

[11] Patent Number: 5,977,275
[45] Date of Patent: Nov. 2, 1999

[54] POLYMERS HAVING PENDANT POLYSACCHARIDE MOIETIES AND USES THEREOF

[75] Inventors: Klein A. Rodrigues, Signal Mountain; Allen M. Carrier; James B. Furr, both of Hixson, all of Tenn.

[73] Assignee: National Starch and Chemical Investment Holding Corporation, Wilmington, Del.

[21] Appl. No.: 09/025,002

[22] Filed: Feb. 17, 1998

[51] Int. Cl.$^6$ .................................................. C08F 291/00
[52] U.S. Cl. .................. 526/238.2; 526/238.23; 510/281; 510/299
[58] Field of Search ................. 526/238.2, 238.23; 510/281, 299

[56] References Cited

U.S. PATENT DOCUMENTS 5,654,198  8/1997  Carrier et al. ............... 526/238.23

*Primary Examiner*—Nathan M. Nutter
*Attorney, Agent, or Firm*—John D. Thallemer

[57] ABSTRACT

The present invention relates to a water-soluble or water-dispersible polymer having pendant polysaccharide moieties. The invention also provides a method for cleaning an article and a method of providing soil resistance to an article using the polymers having pendant polysaccharide moieties. The polymers are useful in cleaning compositions such as laundry detergents, dishwashing detergents, prespotters, fabric softeners, and hard surface cleaners.

25 Claims, No Drawings

5,977,275

POLYMERS HAVING PENDANT POLYSACCHARIDE MOIETIES AND USES THEREOF

FIELD OF INVENTION

The present invention relates to a water-soluble or water-dispersible polymer having pendant polysaccharide moieties. The invention also provides a method for cleaning an article and a method of providing soil resistance to an article using the polymers having pendant polysaccharide moieties.

BACKGROUND OF THE INVENTION

The primary objective of a cleaning composition is to remove soil from an article. In the case where the cleaning composition is a laundry detergent and the article to be cleaned is not highly stained, surfactants, builders and enzymes formulated into most detergents are adequate to completely remove soil from the article. When stronger cleaning power is needed to remove soil from the article other products such as bleach or laundry boosters are used in addition to the detergent. In addition, washing with hotter water, using longer wash cycles, pre-soaking the soiled article in an aqueous solution containing detergent, or using a spot pretreater are helpful for removing soil.

However, where the article is heavily soiled, or where the soil has penetrated into the article, surfactants, builders, enzymes, bleach, or laundry boosters are not always completely effective in removing soil from an article. Spot pretreaters are useful, but they need to be applied to the stained area prior to washing requiring an inconvenient additional step in the washing process. Additionally, certain soils are particularly difficult to remove from certain types of articles. For example, oil based soils are particularly difficult to remove from synthetic fabrics, and ground in clay or particulate stains are particularly difficult to remove from cotton fabrics. In addition, removing soil can be made more difficult when soil which is suspended in the washing process redeposits onto the article.

Soils commonly found on stained articles include oil and oily particulate stains such as frying oils or grease, sauces like tomato or spaghetti sauce, tea or coffee stains; non-saponifiable oil stains such as used motor oil or petroleum oils; grass stains; enzyme sensitive stains such as fats or proteins; and mineral stains such as clays.

Several solutions have been proposed for improving the cleaning of an article. One proposed solution for cleaning of an article is to add a "soil removal agent" to a cleaning composition to increase soil removal from the article during cleaning. Another proposed solution involves protecting an article with a "soil resistant agent" so that soil is not deposited as easily on the article in comparison to another article not protected by the soil resistant agent. The soil resistant agent may also act to protect the article by making soil on an article easier to remove in comparison to another article which was not protected by the soil resistance agent before being soiled. Another proposed solution involves adding an agent which inhibits soil which has been removed from an article during cleaning from depositing onto the same or different article.

U.S. Pat. No. 3,485,762 describes using styrene-maleic anhydride copolymers derivatized with polyethylene glycols in detergent compositions. While the detergent compositions are effective for removing soil from hydrophobic articles such as polyester, such copolymers are not as effective on hydrophilic articles such as cotton.

U.S. Pat. No. 4,444,561 describes using copolymers prepared from 50 to 90 weight percent of a vinyl ester of $C_1$–$C_4$ aliphatic carboxylic acids, from 5 to 35 weight percent of a N-vinyl lactam, and from 1 to 20 weight percent of a monomer containing basic nitrogen capable of forming a salt or quaternized product, in detergent compositions to inhibit soil redeposition. The disadvantage of using such copolymers, however, is that they are capable of forming cations which may complex with anionic surfactants under certain wash conditions and cause a decrease in cleaning performance. In addition, the cationic copolymers may also undesirably promote fabric greying over multiple washing cycles.

U.S. Pat. No. 5,008,032 describes using copolymers prepared from $C_4$–$C_{26}$ olefins and $\alpha,\beta$-ethylenically unsaturated dicarboxylic anhydrides in detergent formulations. The disadvantage of using such copolymers, however, is that the copolymers are not water-soluble unless hydrolyzed with NaOH.

U.S. Pat. No. 5,580,941 describes using a water-soluble, acid-group containing graft copolymer in detergent formulations. The graft copolymer is obtained by copolymerizing a monomer mixture in the presence of a sugar. The monomer mixture contains a monoethylenically unsaturated $C_3$ to $C_{10}$ monocarboxylic acid, or salt thereof with a monovalent cation, and a monoethylenically unsaturated monomer comprising a monosulfonic acid group, monoethylenically unsaturated sulfuric acid ester, vinylphosphonic acid or salt thereof with a monovalent cation. The disadvantage of using such copolymers, however, is that they are capable of forming cations which may complex with anionic surfactants under certain wash conditions and cause a decrease in cleaning performance. In addition, the cationic copolymers may also undesirably promote fabric greying over multiple washing cycles.

European Patent Application 753 570 A2 describes a soil removal and soil resistant detergent composition containing a vinyl amide polymer which is prepared from 5 to 100 weight percent of a vinyl amide monomer and from 0 to 95 weight percent of a vinyl ester monomer. While the detergent compositions are effective for removing soil from hydrophobic articles such as polyester, such compositions are not as effective for cleaning hydrophilic substrates such as cotton.

SUMMARY OF THE INVENTION

Accordingly, it is an object of the invention to provide a polymer which improves the cleaning properties of cleaning compositions by removing soil.

It is another object of the invention to provide a polymer which improves the cleaning properties of cleaning compositions by inhibiting the redeposition of soil from the cleaning process onto an article.

It is also an object of the invention to provide a polymer which imparts soil resistance to an article.

It is a further object of the invention to provide a polymer which is compatible with other components used in a cleaning composition and which improves the cleaning properties of cleaning compositions by removing soil from hydrophilic and hydrophobic articles.

With regard to the foregoing and other objects, the present invention provides a water-soluble or water-dispersible polymer having pendant polysaccharide moieties, said polymer is prepared by reacting a functionalized polysaccharide moiety having the structure

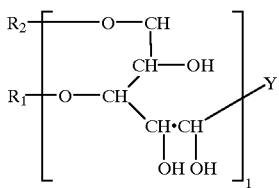

with at least one ethylenically unsaturated monomer to form a polysaccharide monomer which is polymerized to form a polymer having pendant polysaccharide moieties, said polymer having the structure

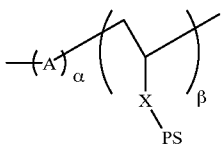

wherein PS is a polysaccharide; A is a comonomer repeating unit; I is an integer of 0 or 1; X is a linking group which is formed by reacting a functional group Y on the polysaccharide with a functional group on the ethylenically unsaturated monomer; X is covalently or ionically bonded to the polysaccharide and to a repeating unit which is derived from an ethylenically unsaturated monomer, and X is selected from the group consisting of amine, ester, amide, imide, urethane, urea, ether, epoxide, lactone and salts thereof; $\alpha$ is from 0 to about 90 mole percent; $\beta$ is from about 10 to 100 mole percent; $R_1$ is H or is represented by the structure

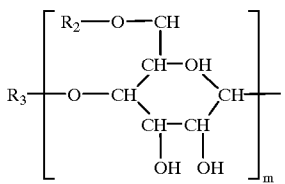

and $R_2$ is H or is represented by the structure

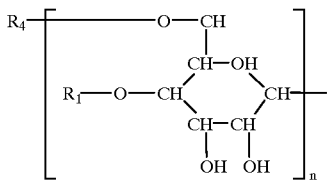

wherein $R_3$ and $R_4$ are independently selected from the group consisting of H, $C_1$–$C_{25}$ alkyl, $C_1$–$C_{25}$ alkaryl, $C_6$–$C_{25}$ aryl, —($CH_2$—$CHR_5$—O)—, and combinations thereof, wherein $R_5$ is selected from the group consisting of H, methyl, ethyl, and benzyl; the sum of m+n is from 0 to about 100, provided that if I is equal to 0 then $R_1$ and $R_2$ are not both H.

According to another aspect the invention provides a water-soluble or water dispersible polymer having pendant polysaccharide moieties which is prepared by reacting the functionalized polysaccharide moiety with at least one ethylenically unsaturated monomer to form a polysaccharide monomer which is then polymerized or copolymerized with a comonomer to form the polymer having pendant polysaccharide moieties. In a preferred embodiment, N-methyl glucamine is reacted with 3-isopropenyl-α,α-dimethylbenzyl isocyanate (m-TMI) to form m-TMI-glucamine wherein the linking group X is a urea group. The m-TMI-glucamine is polymerized to form a polymer having pendant polysaccharide moieties.

According to another aspect the invention provides a water-soluble or water dispersible polymer having pendant polysaccharide moieties which is prepared by reacting the functionalized polysaccharide moiety with a polymer or copolymer prepared by reacting at least one ethylenically unsaturated monomer and optionally a comonomer. In a preferred embodiment, maleic anhydride is polymerized with styrene to produce a styrene-maleic anhydride copolymer. N-methyl glucamine is reacted with the styrene-maleic anhydride copolymer to form N-methyl glucamide derivative of styrene-maleic anhydride copolymer.

According to another aspect the invention provides a water-soluble or water dispersible polymer having pendant polysaccharide moieties which is prepared by reacting the functionalized polysaccharide moiety with a modified polymer or copolymer prepared by reacting at least one ethylenically unsaturated monomer and optionally a comonomer. In a preferred embodiment, vinyl acetate is homopolymerized or copolymerized to polyvinyl acetate which is hydrolyzed to polyvinyl alcohol which is reacted with gluconic acid to form a polymer having pendant polysaccharide moieties. The linking group X is an ester group.

According to another aspect the invention provides a method of cleaning which involves preparing a cleaning composition comprising the polymer having pendant polysaccharide moieties, contacting the cleaning solution with one or more articles, wherein at least one of the articles contains soil, and removing at least a portion of the soil from the article containing soil.

According to a further aspect the invention provides a method of imparting soil resistance to an article which involves preparing a cleaning composition comprising the polymer having pendant polysaccharide moieties, and contacting the cleaning composition with the article to provide soil resistance to the article.

The polymers having pendant polysaccharide moieties when used in a cleaning process, remove soil from articles, inhibit soil deposition on articles, and provide soil resistance to articles. Examples of cleaning compositions containing the polymers having pendant polysaccharide moieties are laundry detergents, prespotters, dishwashing detergents, and hard surface cleaners. The polymers having pendant polysaccharide moieties are sufficiently hydrophobic to absorb to an article such as cloth in a washing process yet retain enough hydrophilic character to decrease the hydrophobic nature of an article such as polyester.

DETAILED DESCRIPTION OF THE INVENTION

The water-soluble or water-dispersible polymer having pendant polysaccharide moieties has the structure

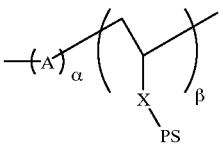

In the above structure for the polymer having pendant polysaccharide moieties, PS is a polysaccharide; A is a repeating unit prepared from a comonomer which is optional; α is from 0 to about 90 mole percent, preferably from 0 to about 75 mole percent, and most preferably from about 60 to about 40 mole percent; β is from about 10 to 100 mole percent, preferably from about 25 to 100 mole percent, and most preferably from about 40 to about 60 mole percent; and X is a linking group.

The water-soluble or water-dispersible polymer having pendant polysaccharide moieties is prepared by reacting a functionalized polysaccharide moiety with an ethylenically unsaturated monomer. The functionalized polysaccharide moiety has the structure

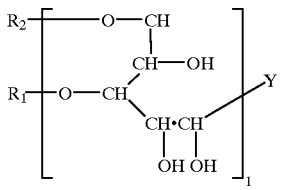

The polysaccharide moiety includes saccharides, oligosacchrides and polysaccharides. Suitable saccharides are, for example, starches, hydrolyzed starches, sugars, lactose, maltose, maltodextrins, corn syrup solids, cellulose, hydrolyzed cellulose, dextran, hydrolyzed dextran, guar gum, hydrolyzed guar gum, locust bean gum and hydrolyed locust bean gum. Suitable starches include, for example, corn, potato, tapioca, and rice. A preferred saccharide is glucose.

The linking group X is formed by reacting a functional group Y on the polysaccharide with a suitable functional group on the ethylenically unsaturated monomer or polymer. As used herein, "suitable functional group" means that the functional group on the ethylenically unsaturated monomer or polymer must be capable of reacting with the functional group Y to form the linking group X. The linking group X can be any group that covalently or ionically bonds the polysaccharide to the ethylenically unsaturated monomer which can be polymerized to form the polymer of the invention. In the alternative, the linking group X can be any group that covalently or ionically bonds a polymer capable of reacting with the functional group Y on the polysaccharide to form the polymer of the invention. For example, the linking group X may be selected from an amine, ester, amide, imide, urethane, urea, ether, epoxide, lactone or salt thereof. Any combination of linking groups may be used in the polymers having pendant polysaccaride moieties of the invention. Preferably X is an amide having the formula —C(O)—NR— wherein R is H or a $C_1$ to $C_{20}$ alkyl group, most preferably R is H or methyl. Preferably the functionalized polysaccharide moiety is selected from N-methyl glucamine, N-methyl lactamine, or N-methyl oligosaccharide.

In the structure for the polysaccharide moiety, I is an integer of 0 or 1; $R_1$ is H or is represented by the structure

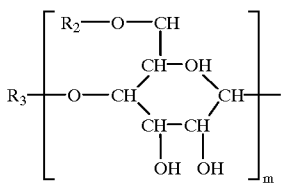

In the structure for $R_1$, $R_3$ is selected from H, $C_1$–$C_{25}$ alkyl, $C_1$–$C_{25}$ alkaryl, $C_6$–$C_{25}$ aryl, —($CH_2$—$CHR_5$—O)—, or combinations thereof, and $R_5$ is selected from H, methyl, ethyl, or benzyl.

In the structure for the polysaccharide moiety, $R_2$ is H or is represented by the structure

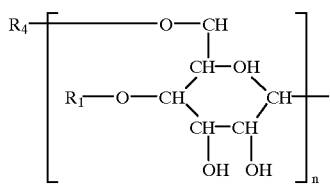

In the structure for $R_2$, $R_4$ is selected from H, $C_1$–$C_{25}$ alkyl, $C_1$–$C_{25}$ alkaryl, $C_6$–$C_{25}$ aryl, —($CH_2$—$CHR_5$—O)—, or combinations thereof, and $R_5$ is selected from H, methyl, ethyl, or benzyl. The sum of m+n is from 0 to about 100. It is noted that $R_1$ and $R_2$ are not both hydrogen if I is equal to 0.

In one embodiment of the invention, the functionalized polysaccharide moiety is prepared by reductive amination with or without a solvent. Preferably the reductive amination reaction is conducted in water without a cosolvent and involves mixing a saccharide with an amine in water, and then contacting the mixture with pressurized hydrogen in the presence of a Group VIIIB metal catalyst and under conditions effective to produce an amino saccharide. Methods for preparing the functionalized polysaccharide are disclosed in U.S. Pat. No. 5,654,198 which is incorporated herein by reference.

The ethylenically unsaturated monomer must have a functionality which is capable of reacting with the functionalized polysaccharide to form the linking group X. The ethylenically unsaturated monomer is selected from anhydrides, vinyl esters, alkyl esters of acrylic and methacrylic acid, substituted or unsubstituted mono and dialkyl esters of unsaturated dicarboxylic acids, unsaturated carboxylic acids, vinyl aromatics, unsubstituted or substituted acrylamides, cyclic monomers, monomers containing alkoxlated side chains, sulfonated monomers, and vinyl amide monomers. A combination of ethylenically unsaturated monomers may also be used.

Suitable anhydride monomers are, for example, maleic anhydride and itaconic anhydride. Suitable vinyl esters are, for example, vinyl acetate, vinyl formate, vinyl propionate, vinyl butyrate, vinyl isobutyrate, vinyl valerate, vinyl 2-ethyl-hexanoate, etc. Suitable alkyl esters of acrylic and methacrylic acid are, for example, methyl acrylate, methyl methacrylate, ethyl acrylate, ethyl methacrylate, butyl acrylate, etc. Suitable substituted or unsubstituted mono and dialkyl esters of unsaturated dicarboxylic acids are, for example, substituted and unsubstituted mono and dibutyl, mono and diethyl maleate esters as well as the corresponding fumarates. Suitable unsaturated carboxylic acids are, for example, crotonic acid, acrylic acid, methacrylic acid, fumaric acid, maleic acid, itaconic acid, citraconic acid, and their alkyl esters etc. Suitable vinyl aromatic monomers are, for example, 3-isopropenyl-α, α-dimethylbenzyl isocyanate, and halogenated styrenes. Suitable acrylamide based monomers are, for example, acrylamide, N, N dimethylacrylamide, N-octyl acrylamide, N-methylol acrylamide, dimethylaminoethylacrylate etc. Suitable cyclic monomers are, for example, vinyl pyrrolidone, vinyl imidazolidone, vinyl pyridine etc. Suitable sulfonated monomers are, for example, 2-acrylamido-2-methyl propane sulfonic acid, sodium methallyl sufonate, sodium vinyl sulfonate, sulfonated sytrene etc. Suitable vinyl amidemonomers are, for example, N-vinyl formamide, N-vinyl acetamide etc.

The ethylenically unsaturated monomer is preferably selected from maleic anhydride, itaconic anhydride, acrylic acid, methacrylic acid, and 3-isopropenyl-α,α-dimethylbenzyl isocyanate.

The ethylenically unsaturated monomer may be used in conjunction with a comonomer. The comonomer has a double bond which is capable of undergoing free radical initiation. The comonomer is distinguished from the ethylenically unsaturated monomer in that the comonomer does not necessarily contain a functional group which is capable of reacting with the functionalized polysaccharide to form the linking group X. However, the comonomer may contain a functional group which is capable of reacting with the functionalized polysaccharide but is not reacted with the polysaccharide. The comonomer is selected, for example, from vinyl esters, α-olefins, alkyl esters of acrylic and methacrylic acid, substituted or unsubstituted mono and dialkyl esters of unsaturated dicarboxylic acids, unsaturated carboxylic acids, vinyl aromatics, unsubstituted or substituted acrylamides, cyclic monomers, monomers containing alkoxlated side chains, sulfonated monomers, and vinyl amide monomers. A combination of comonomers may also be used.

Suitable α-olefin based monomers are, for example, $C_4$ to $C_{20}$ based alkyl monomers such as 1-octene, butylene, 1 dodecene etc. The comonomer may have $C_1$–$C_{25}$ alkyl side chains and/or alkoxylated side chains. The side chains are linked to the comonomer by means of ester or amide linkages. Suitable side chains include, for example, polyethylene glycol, polypropylene glycol and alcohol ethoxylates. Preferred comonomers include ethylene, styrene, acrylic acid and methacrylic acid.

In one embodiment of the invention, the water-soluble or water dispersible polymer having pendant polysaccharide moieties is prepared by reacting the functionalized polysaccharide moiety with at least one ethylenically unsaturated monomer to form a polysaccharide monomer which is then polymerized or copolymerized with a comonomer to form the polymer having pendant polysaccharide moieties. In a preferred embodiment, N-methyl glucamine is reacted with 3-isopropenyl-α,α-dimethylbenzyl isocyanate (m-TMI) to form m-TMI-glucamine wherein the linking group X is a urea group which is formed by the reaction of the functional group Y, the amine on the N-methyl glucamine and the isocyanate group of the m-TMI monomer. The m-TMI-glucamine is polymerized to form a polymer having pendant polysaccharide moieties.

In another embodiment of the invention, a water-soluble or water dispersible polymer having pendant polysaccaride moieties is prepared by reacting the functionalized polysaccharide moiety with a polymer or copolymer prepared by reacting at least one ethylenically unsaturated monomer and optionally a comonomer.

In a preferred embodiment, maleic anhydride which is an ethylenically unsaturated monomer is polymerized with styrene which is a comonomer to produce a styrene-maleic anhydride copolymer. N-methyl glucamine is reacted with the styrene-maleic anhydride copolymer to form N-methyl glucamide derivative of styrene-maleic anhydride copolymer. Some of the N-methyl glucamine may form the acid salt of the carboxylic acid which is generated as a byproduct of this reaction. The linking group X is an amide or an amine salt of the carboxylic acid. In another preferred embodiment, glucamine is reacted with the styrene-maleic anhydride copolymer to form a polymer having pendant polysaccharide moieties. The linking group X is an imide.

In another embodiment of the invention, a water-soluble or water dispersible polymer having pendant polysaccharide moieties is prepared by reacting the functionalized polysaccharide moiety with a modified polymer or copolymer prepared by reacting at least one ethylenically unsaturated monomer and optionally a comonomer. As used herein, "modified" polymer or copolymer means that the polymer or copolymer is altered to introduce a functional group capable of reacting with the functionalized polysaccharide.

In a preferred embodiment, vinyl acetate is homopolymerized or copolymerized to polyvinyl acetate which is hydrolyzed to polyvinyl alcohol which is reacted with gluconic acid to form a polymer having pendant polysaccharide moieties. The linking group X is an ester group. In another preferred embodiment, N-vinyl formamide is homopolymerized or copolymerized to poly(N-vinyl formamide) which is hydrolyzed to polyvinyl amine which is reacted with gluconic acid to form a polymer having pendant polysaccharide moieties. The linking group X is an amide. In another preferred embodiment, N-vinyl formamide is homopolymerized or copolymerized to poly(N-vinyl formamide) which is hydrolyzed to polyvinyl amine which is reacted with glucose and hydrogenated to form a polymer having pendant polysaccharide moieties. The linking group X is an amine.

The water-soluble or water-dispersible polymers having pendant polysaccharide moieties may be prepared by any number of conventional means well known to those skilled in the art such as bulk, emulsion, suspension, precipitation, or solution polymerization. Preferably, the polymers are prepared by solution polymerization in an aqueous medium in the presence of a free radical initiator. Essentially any type of free radical initiator can be used to initiate the free radical polymerization.

Some representative examples of free radical initiators which are commonly used include the various persulfates, percarbonates, perborates, peroxides, azo compounds, and alkyl perketals. Examples of free radical initiators are potassium persulfate, ammonium persulfate, sodium persulfate, benzoyl peroxide, hydrogen peroxide, di-t-butyl peroxide, dicumyl peroxide, caproyl peroxide, 2,4-dichlorobenzoyl perooxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, 2,2'azobis(N, N'dimethyleneisobutyramidine) dihydrochloride, 2,2'azobis(2-amidinopropane) dihydrochloride, 2,2'-azobis(N,N'-dimethyleneisobutyramidine), 4,4'-azobis(4-cyanopentanoic acid), 2,2'-azobis{2-methyl-N-[1,1-bis(hydroxymethyl)-2hydroxyethyl] propionamide}, 2,2'-azobis[2-methyl-N-(2-hydroxyethyl) propionamide], 2,2'-azobis(isobutyramide) dihydrate, 2,2-bis-(t-butylperoxy)butane, ethyl 3,3-bis(t-butylperoxy)butyrate, and 1,1-di-(t-butylperoxy) cycloyhexane. Any combination of free radical initiators may be used to prepare the polymers of the invention.

The amount of free radical initiator employed will vary with the desired molecular weight of the polymer being synthesized. Higher molecular weights are achieved by utilizing smaller quantities of the initiator and lower molecular weights are attained by employing larger quantities of the initiator. However, as a general rule from about 0.005 to about 10 weight percent, preferably from about 0.1 to about 4 weight percent, based on total weight of monomer of the initiator will be included in the reaction mixture.

The polymerization will typically be conducted at a temperature which is within the range of about 30° C. to about 90° C. It is generally preferred for the polymerization to be carried out at a temperature which is with the range of 50° C. to about 85° C.

The polymer having pendant polysaccharide moieties may be used in any cleaning composition. As used herein, "clean" means to remove soil from an article, inhibit soil deposition in a cleaning or washing process, or provide soil resistance to an article or combinations thereof. Articles which may be cleaned using the polymers having pendant polysaccharide moieties of the present invention are articles which come into contact with soil and which are capable of being cleaned in a cleaning process. Examples of articles which may be cleaned using the polymer having pendant polysaccharide moieties include fabrics, such as clothing, linens, carpets, or upholstery; hard surfaces such as countertops, windows, floors, dishes, glasses or tiles; or automobiles.

The cleaning composition may be a solid or liquid composition. If the cleaning composition is solid, the cleaning composition may be in any of the usual physical forms, such as for example, powders, beads, flakes, bars, tablets, noodles, pastes, and slurries. If the cleaning composition is liquid, the cleaning composition preferably disperses or solubilizes the polymer having pendant polysaccharide moieties so that it is easily contacted with the article. The cleaning composition may be aqueous or nonaqueous. For example, the polymer having pendant polysaccharide moieties may be dissolved or dispersed in water, in one or more solvents or inert diluents. Preferably the cleaning composition is aqueous. The cleaning composition preferably contains the polymer having pendant polysaccharide moieties in an amount of from about 1 to about 60 weight percent, more preferably from about 2 to about 20 weight percent, based on the total weight of the cleaning composition.

The cleaning compositions prepared using the polymers having pendant polysaccharide moieties may contain any additional components which are used in cleaning compositions. Such additional components are well known to those skilled in the art and include one or more surfactants, builders, ion exchangers, alkalies, anticorrosion materials, antiredeposition materials, optical brighteners, fragrances, dyes, chelating agents, enzymes, whiteners, brighteners, antistatic agents, sudsing control agents, solvents, hydrotropes, bleaching agents, perfumes, bleach precursors, water, buffering agents, soil removal agents, soil release agents, softening agent, opacifiers, inert diluents, buffering agents, corrosion inhibitors, graying inhibitors, antiredeposition agents, stabilizers, opacifiers, fillers, builders, phosphate co-builder, and phosphate-replacer builder. Combinations of such additional components may also be used.

Preferably cleaning compositions prepared using the polymers having pendant polysaccharide moieties contain at least one surfactant. Suitable surfactants include nonionic, anionic, cationic, and amphoteric surfactants. The surfactants usable in the composition may also be soaps.

Anionic surfactants include, for example, from $C_8$ to $C_{12}$ alkylbenzenesulfonates, from $C_{12}$ to $C_{16}$ alkanesulfonates, from $C_{12}$ to $C_{16}$ alkylsulfates, from $C_{12}$ to $C_{16}$ alkylsulfosuccinates or from $C_{12}$ to $C_{16}$ sulfated ethoxylated alkanols.

Nonionic surfactants include, for example, from $C_6$ to $C_{12}$ alkylphenol ethoxylates, from $C_{12}$ to $C_{20}$ alkanol alkoxylates, and block copolymers of ethylene oxide and propylene oxide. Optionally, the end groups of polyalkylene oxides can be blocked, whereby the free OH groups of the polyalkylene oxides can be etherified, esterified, acetalized and/or aminated. Another modification consists of reacting the free OH groups of the polyalkylene oxides with isocyanates. The nonionic surfactants also include $C_4$ to $C_{18}$ alkyl glucosides as well as the alkoxylated products obtainable therefrom by alkoxylation, particularly those obtainable by reaction of alkyl glucosides with ethylene oxide.

Cationic surfactants contain hydrophilic functional groups where the charge of the functional groups are positive when dissolved or dispersed in an aqueous solution. Typical cationic surfactants include, for example, amine compounds, oxygen containing amines, and quaternary amine salts.

Amphoteric surfactants contain both acidic and basic hydrophilic groups. Amphoteric surfactants are preferably derivatives of secondary and tertiary amines, derivatives of quaternary ammonium, quaternary phosphonium or tertiary sulfonium compounds. The cationic atom in the quaternary compound can be part of a heterocyclic ring. The amphoteric surfactant preferably contains at least one aliphatic group, containing about 3 to about 18 carbon atoms. At least one aliphatic group preferably contains an anionic water-solubilizing group such as a carboxy, sulfonate, or phosphono.

Generally, anionic surfactants, such as linear alkyl sulfonates (LAS) are preferred for use in solid cleaning compositions containing the polymers having pendant polysaccharide moieties. Nonionic and anionic surfactant mixtures such as alcohol ethoxylates and LAS are preferred in liquid cleaning compositions containing the polymers having pendant polysaccharide moieties. The surfactants are optionally present in an amount of from about 0 to about 50 weight percent, preferably from about 2 to about 45 weight percent, and more preferably from about 5 to about 40 weight percent of the cleaning composition.

Examples of builders which may be present in the cleaning composition include, for example, phosphates, such as pyrophophates, polyphosphates, or sodium tripolyphosphate. Further examples are zeolites, sodium carbonate, poly(carboxylic acids), nitrotriacetic acid, citric acid, tartaric acid, the salts of the aforesaid acids and the monomeric, oligomeric, or polymeric phosphonates. Combinations of builders may also be used. The builders are optionally present in an amount of from 0 to about 85 weight percent, preferably from about 5 to about 50 weight percent based on the total weight of the cleaning composition.

Liquid cleaning compositions containing the polymers having pendant polysaccharide moieties can contain up to 80 weight percent water or solvents or combinations thereof. Typical solvents which may be used include oxygen containing solvents such as alcohols, esters, glycol, and glycol ethers. Alcohols that may be used in the cleaning compositions include, for example, methanol, ethanol, isopropanol, and tertiary butanol. Esters which may be used include, for example, amyl acetate, butyl acetate, ethyl acetate, and esters of glycols. Glycols and glycol ethers that are useful as solvents include, for example, ethylene glycol, propylene glycol, and oligomers of ethylene or propylene glycol.

Solid cleaning compositions containing the polymers having pendant polysaccharide moieties preferably contain up to 60 weight percent of one or more solid inert diluents such as sodium sulfate, sodium chloride, sodium borate, or selected polymers such as polyethylene glycol or propylene glycol.

The cleaning composition may contain 0 to about 50 weight percent of one or more buffering agents. Buffering agents include, for example, one or more alkali metal salts such as silicates, carbonates, or sulfates. Buffering agents also include, for example, organic alkalis such as triethanolamine, monoethanolamine, and triisopropanolamine.

Fabric softening agents typically include quaternary ammonium salts such as ditallowdimethyl-ammonium chloride.

Other additives which optionally may be included in the cleaning compositions especially for detergent compositions are bleaching agents, used in an amount of up to about 30 weight percent, corrosion inhibitors such as silicates used in an amount of up to about 25 weight percent, dye deposition inhibiting agents used in an amount up to about 20 weight percent, and graying inhibitors used in an amount of up to about 5 weight percent.

Suitable bleaching agents are, for example, perborates, percarbonates, or chlorine-generating substances such as chloroisocyanurates. Suitable silicates used as corrosion inhibitors are, for example, sodium silicate, sodium disilicate, and sodium metasilicate. Suitable dye deposition inhibiting agents are, for example, polyvinyl pyrrolidone. Examples of graying inhibitors are, for example, carboxymethylcellulose, methylcellulose, hydroxypropylmethylcellulose, and graft copolymers of vinyl acetate and polyalkylene oxides having a molecular weight of 1,000 to 15,000.

The cleaning composition containing the polymer having pendant polysaccharide moieties is contacted with one or more articles, where at least one article contains soil. Contacting can be carried out, for example, by immersing the articles in the cleaning composition and agitating the articles in the cleaning composition containing the polymer. Contacting can also be accomplished by wiping, spraying, or padding the cleaning composition on the articles.

In a preferred embodiment of the invention, the polymer having pendant polysaccharide moieties is incorporated in a detergent formulation. In a detergent formulation, the polymers having pendant polysaccharide moieties are preferably present in an amount of from about 0.1 to about 25 weight percent, more preferably from about 0.5 to about 10 weight percent, and most preferably from about 1 to about 5 weight percent, based on the total weight of the detergent formulation. When the detergent formulation is a laundry detergent, the polymers having pendant polysaccharide moieties function to reduce the amount of oily soil that can adhere to the cloth. Subsequent washing of the cloth will remove more soil as a result of the reduced interactions between the soil and the cloth.

In another preferred embodiment of the invention, the polymers having pendant polysaccharide moieties are incorporated into a prespotter formulation for direct application to a soiled fabric or carpet. The polymers aid in removal of soil from fabric even if the fabric is washed in a laundry detergent which does not contain the polymers. When used in a prespotter formulation, the polymers having pendant polysaccharide moieties are preferably present in an amount of from about 0.5 to about 75 weight percent, more preferably from about 1 to about 15 weight percent, and most preferably from about 2 to about 10 weight percent, based on the total weight of the prespotter formulation.

In another preferred embodiment of the invention, the polymers having pendant polysaccharide moieties are incorporated into a fabric softening composition. The polymers aid in release of soil during fabric softening.

The following nonlimiting examples illustrate further aspects of the invention.

EXAMPLE 1

Styrene-maleic anhydride copolymer resin (SMA) which is commercially available as SMA 1000 from Elf Atochem, 120 grams, and 120 grams of N-methyl glucamine (Gluc) were added to 1200 grams of water and stirred to form a mixture. The mixture was heated to 95° C. and the temperature was maintained for six hours to form a polymer. As the reaction proceeded, the reaction mixture which initially appeared as a white opaque slurry became a clear yellow solution. The percent solids of the polymer was determined to be approximately 17%.

EXAMPLE 2

The polymer prepared in Example 1 was evaluated for soil release in a TERG-O-TOMETER test. Three cotton swatches were washed to remove the original textile finish. The initial L, a, and b values for each of the swatches was measured using a Minolta calorimeter. The swatches in each TERG-O-TOMETER were washed using 0.5 g/L of AATCC detergent (American Association of Textile Chemists and Colorists, available from Textile Innovators, Windsor, North Carolina), 18 weight percent polymer based on weight of detergent, 110 ppm hardness water based on MgCl and CaCl, 93° F. and stirred at 80 rpm. A 20 minute wash and a 3 minute rinse were used. Each of the swatches was dried in a print drier or a standard clothes drier and then stained with spaghetti sauce (RAGU traditional). The stains were allowed to set overnight. The L, a and b values for each of the stained swatches was measured.

The stained swatches were washed using 0.5 g/L of AATCC detergent, 18 weight percent polymer based on weight of detergent, 110 ppm hardness water based on MgCl and CaCl, 93° F. and stirred at 80 rpm. A 20 minute wash and a 3 minute rinse were used. Each of the swatches was dried in a print drier or a standard clothes drier. The L, a and b values for each of the swatches was measured.

The ΔE for the stain on each swatch was calculated from the following equation:

$$\Delta E = [(L_1-L_2)^2+(a_1-a_2)^2+(b_1-b_2)^2]^{0.5}$$

The percent soil removal for each swatch was calculated from the following equation:

$$\% \text{ soil removal} = \frac{\text{soil removed}}{\text{total soil}} \times 100 = \frac{\Delta Ea-s}{\Delta Eb-s} \times 100$$

wherein ΔEa-s is the difference in E after the stain is put on and after the swatch with the stain is washed and ΔEb-s is the difference between after the stain is put on and no stain at all. The soil release test results for each of the swatches is summarized in Table I.

TABLE I

| Polymer | % soil release | Ave % soil release |
|---------|---------------|--------------------|
| No polymer | 52.6 | 53.4 |
|  | 59.3 |  |
|  | 48.3 |  |
| No polymer | 60.7 | 56.7 |
|  | 53.4 |  |
|  | 56.0 |  |
| Example 1 | 54.8 | 60.0 |
|  | 62.8 |  |
|  | 62.3 |  |
| Example 1 | 66.0 | 66.3 |
|  | 68.5 |  |
|  | 64.5 |  |

The results in Table I show that the polymer having pendant polysaccharide moieties as prepared in Example 1 is effective as a soil release agent.

EXAMPLE 3

The polymer having pendant polysaccharide moieties as prepared in Example 1 was evaluated for compatibility in WISK which is a commercially available liquid detergent. The polymer in an amount of 1 weight percent was added to the liquid detergent. The polymer was very compatible in the liquid detergent at room temperature. An accelerated aging test was conducted wherein the compatibility of the polymer was determined over one month at 40° C. The test results are summarized in Table II.

TABLE II

| Polymer | Compatibility at 40° C. for 1 month |
|---|---|
| Example 1 | 1 phase |

The results in Table II show that the polymer having pendant polysaccharide moieties as prepared in Example 1 was compatible in a liquid detergent.

EXAMPLE 4

The polymer prepared in Example 1 was evaluated for soil release in a TERG-O-TOMETER test. Three polyester swatches were washed to remove the original textile finish. The initial L, a, and b values for each of the swatches was measured using a Minolta calorimeter. The swatches in each TERG-O-TOMETER were washed using 0.5 g/L of AATCC detergent, 18 weight percent polymer based on weight of detergent, 110 ppm hardness water based on MgCl and CaCl, 93° F. and stirred at 80 rpm. A 20 minute wash and a 3 minute rinse were used. Each of the swatches was dried in a print drier or a standard clothes drier and then stained with spaghetti sauce (RAGU traditional). The stains were allowed to set for three hours. The L, a, and b values for each of the stained swatches was measured.

The stained swatches were washed using 0.5 g/L of AATCC detergent, 110 ppm hardness water based on MgCl and CaCl, 93° F. and stirred at 80 rpm. The wash water did not contain any polymer. A 20 minute wash and a 3 minute rinse were used. Each of the swatches was dried in a print drier or a standard clothes drier. The L, a, and b values for each of the swatches was measured. The test results are summarized in Table III.

TABLE III

| Polymer | % soil release | Ave % soil release |
|---|---|---|
| No polymer | 70.0 | 60.3 |
|  | 57.7 |  |
|  | 53.3 |  |
| No polymer | 64.7 | 62.0 |
|  | 68.3 |  |
|  | 52.8 |  |
| No polymer | 59.5 | 56.8 |
|  | 51.6 |  |
|  | 59.3 |  |
| Polymer of Ex. 1 | 74.0 | 64.8 |
|  | 63.8 |  |
|  | 56.7 |  |
| Polymer of Ex. 1 | 77.1 | 70.1 |
|  | 73.8 |  |
|  | 59.5 |  |
| Polymer of Ex. 1 | 69.2 | 70.0 |
|  | 72.6 |  |
|  | 68.3 |  |

The results in Table 3 show that the polymer prepared in Example 1 having pendant polysaccharide moieties exhibited soil guard properties such that the average soil release of samples prewashed with the polymer was much greater than samples not prewashed with the polymer even though no polymer was used in the wash after the swatches were stained. Thus, the polymers having pendant polysaccharide moieties provide stain resistance to fabric.

EXAMPLE 5

Styrene-maleic anhydride resin which is commercially available as SMA 1000 from Elf Atochem, 10 grams, and 15 grams of N-methyl glucamine were added to 70 grams of water and stirred to form a mixture. The mixture was heated to 95° C. and the temperature was maintained for six hours to form a polymer. As the reaction proceeded, the reaction mixture which initially appeared as a white opaque slurry became a clear yellow solution. The percent solids of the polymer was determined to be approximately 27.5%.

EXAMPLE 6

In this example, the molecular weight of the ethylene-maleic anhydride copolymer was determined as follows. A sample of linear ethylene-maleic anhydride polymer was obtained from Zeeland Chemicals and hydrolyzed prior to measuring the molecular weight. 5.0 grams of the polymer were stirred with 100.0 grams of water and 2.4 grams of 50% sodium hydroxide. The reaction temperature was raised to 60° C. for 6 hours. A clear solution of the hydrolyzed polymer (ethylene-maleic acid sodium salt) was obtained.

The molecular weight of this hydrolyzed polymer was then determined by gel permeation chromatography under the following conditions. The column bank used were TSK PWxI columns, specifically G4000PWxI, G3000PWxI, and G2500PWxI columns available from Toso-Haas Progel. The mobile phase consisted of 0.05M sodium phosphate monobasic and 0.05M sodium phosphate dibasic. This mobile phase was also used as the diluent in the preparation of the standards and the polymer sample, both of which were diluted to one percent total solids content. The detector used was a differential refractometer operated at 30 degrees Celsius. The polymer was compared to a calibration curve of the following four standards: PAA35K, PAA85K, 130K, and 165K which are pure sodium polyacrylate standards available from American Polymer Standards Corporation. The injection volume was 50 microliters with a run time of 45 minutes. The ethylene-maleic anhydride copolymer was determined to have a weight average molecular weight of 50,000.

The ethylene-maleic anhydride copolymer, 10 grams, and 15.7 grams of N-methyl glucamine were added to 50 grams of water and stirred to form a mixture. The mixture was heated to 50° C. and the temperature was maintained for seven hours to form a polymer. As the reaction proceeded, the reaction mixture which initially appeared as a white opaque slurry became a clear solution. The percent solids of the polymer was determined to be approximately 18.2.

EXAMPLE 7

Styrene-maleic anhydride resin which is commercially available as SMA 1000 from Elf Atochem, 10.0 grams, and 8.0 grams of N-methyl glucamine, and 2.0 grams of Jeffamine XTJ 505, which is available from Huntsman Corp., were added to 50 grams of water and stirred to form a mixture. The mixture was heated to 95° C. and the temperature was maintained for six hours to form a polymer. As the reaction proceeded, the reaction mixture which initially appeared as a white opaque slurry became a slightly opaque low viscosity solution. The percent solids of the polymer was determined to be approximately 37.1.

EXAMPLE 8

Styrene-maleic anhydride resin which is commercially available as SMA 1000 from Elf Atochem, 10.0 grams, and 6.0 grams of N-methyl glucamine, and 4.0 grams of Jeffamine XTJ 505 were added to 100 grams of water and stirred to form a mixture. The mixture was heated to 90° C. and the temperature was maintained for six hours to form a polymer. As the reaction proceeded, the reaction mixture which initially appeared as a white opaque slurry became a white slightly opaque low viscosity solution. The percent solids of the polymer was determined to be approximately 18.

EXAMPLE 9

Primary detergency test was conducted using cotton swatches stained with dust-sebum which is a stain prepared from a mixture of body oils. The stained swatches were obtained from Textile Innovators in Windsor, N.C. The test was conducted in a TERG-O-TOMETER using 0.5 g/L of AATCC detergent, 4 weight percent polymer based on weight of detergent, 110 ppm hardness water based on 2:1 Ca:Mg, 93° F. and stirred at 80 rpm. A 10 minute wash and a 5 minute rinse were used. The L values of the swatches were measured before and after the wash. The test results are summarized in Table IV.

TABLE IV

| Polymer | Primary detergency on cotton on dust-sebum ΔL |
| --- | --- |
| None | 0 |
| Example 1 | 0.95 |
| Example 5 | 1.46 |
| Example 6 | 1.26 |
| Example 7 | 1.27 |
| Example 8 | 0.65 |

The results in Table IV show that the polymers having pendant polysaccharide moieties exhibit excellent primary detergency on dust-sebum on cotton.

EXAMPLE 10

The polymers prepared in Examples 5, 6, 7 and 8 were evaluated for soil release in a TERG-O-TOMETER test according to the procedure set forth in Example 2. The results of the soil release tests are summarized in Table V.

TABLE V

| Polymer | Ave % soil release |
| --- | --- |
| None | 37.7 |
| SRP4 | 43.7 |
| Example 1 | 44.9 |
| Example 5 | 31.0 |
| Example 6 | 54.7 |
| Example 7 | 52.2 |

The results in Table 5 show that the polymers prepared in Examples 5, 6, 7 and 8 exhibit excellent soil release properties due to the higher values which show better soil release or the greater percentage of stain removed. The soil release properties of the polymers having pendant polysaccharide moieties prepared in Examples 6 and 7 are significantly better than the commercial polyester soil release agents such as SRP4 available from Rhone Poulenc.

EXAMPLE 11

The polymer prepared in Examples 1 was added to an ironing aid prepared from polyacrylic acid and dihydroxyethyl urea crosslinker and evaluated as to whether it improves the soil resistance of the ironing aid.

Three swatches were ironed with an ironing aid containing a mixture of 4 weight percent, based on the weight of the total ironing aid, of ALCOSPERSE-602A, a sodium polyacrylate industry standard which is commercially available from Alco Chemical located in Chattanooga, Tenn., and 12 weight percent, based on the weight of ALCOSPERSE-602A, of dihydroxy ethyl urea. The swatches were stained and washed using 0.9 g/L of AATCC detergent, 110 ppm hardness water, 93° F. and stirred at 80 rpm. The wash cycle had a 10 minute wash and a 5 minute rinse.

Three additional swatches were ironed with the above described ironing aid which also included 4 weight percent, based on the weight of ALCOSPERSE-602A, of the polymer prepared in Example 1. The swatches were stained with mustard and washed using 0.9 g/L of AATCC detergent, 110 ppm hardness water, 93° F. and stirred at 80 rpm. The wash cycle had a 10 minute wash and a 5 minute rinse. Soil release data for the swatches is summarized in Table VI.

TABLE VI

| Ironing aid | Ave % soil release on cotton | Ave % soil release on polycotton | Ave % soil release on polyester |
| --- | --- | --- | --- |
| Base formulation | 27.9 | 30.8 | 24.4 |
| Base formulation + Polymer of Ex. 1. | 40.2 | 41.4 | 48.5 |

The results in Table VI clearly show that the addition of the polymer having pendant polysaccharide moieties to an ironing aid significantly improves the soil release of a stain from cotton, polycotton and polyester which is subsequently washed.

EXAMPLE 12

The polymers prepared in Examples 1 and 6 were evaluated in a prespotter test. Two grams of each of the polymers was applied and spread over a dust-sebum stain on cotton swatches and polyester swatches. The stains were allowed to set overnight. Two control swatches were also prepared which did not contain any polymer. Each of the swatches were washed in 0.9 g/L of AATCC detergent, 110 ppm hardness water, at 93° F. and stirred at 80 rpm. The wash cycle had a 10 minute wash and a 5 minute rinse. The L, a, and b values for each of the swatches prior to treating with the polymers and after washing were measured and the ΔE values were calculated by the method set forth in Example 2. The test results are summarized in Table VIII.

TABLE VIII

| Polymer | ΔE for dust-sebum on cotton |
| --- | --- |
| None | 7.9 |
| Example 1 | 13.9 |
| Example 6 | 9.6 |

The results in Table VIII show that the polymers having pendant polysaccharide moieties aid in removing stains from fabrics such as cotton even when the fabric is prespotted with the polymer and subsequently washed in a laundry detergent which does not contain the polymer.

EXAMPLE 13

Preparation of polysaccharide monomer having side chains.

N-methyl glucamine, 64 grams, was dissolved in 336 grams of tap water and added to a reaction vessel. 3-Isopropenyl-(α,α-dimethylbenzyl isocyanate available from Cytec Industries (m-TMI), 72 grams, was added to the reaction vessel and the mixture was stirred vigorously at ambient temperature for about 16 hours to form a reaction product. The reaction product was filtered and the aqueous solution was analyzed IR and NMR. The analysis indicated that the TMI-N-methyl glucamine had been synthesized. The TMI-N-methyl glucamine can be copolymerized by methods known to those skilled in the art.

EXAMPLE 14

Styrene maleic anhydride copolymer (SMA 1000 from Elf Atochem), 11 grams, and 118 grams of an alkyl polyglycoside surfactant DYMSOL UWA from Henkel were added to a reactor. The reaction mixture was heated to 85° C. and held at that temperature for a period of 6 hours to form a reaction product. Tap water, 250 grams, was added to the reaction product during cooling. The appearance of the reaction product was a dark brown solution. Analysis indicated that the reaction product contained approximately 24 weight percent solids.

EXAMPLE 15

The polymer prepared in Example 14 was evaluated in a primary detergency test. In this test, 3 dust sebum swatches on cotton (available from Test Fabrics) and 10 3"×4" cotton swatches were washed in a TERG-O-TOMETER pot using 0.9 grams/liter of a liquid detergent having the formula:

| Ingredient | Weight Percent |
| --- | --- |
| Water | 65.5 |
| Sodium citrate | 6.0 |
| Propylene glycol | 5.3 |
| Sodium xylene sulfonate | 5.0 |
| Biosoft D-40 (Stepan) | 13.3 |
| Neodol 25-7 (Shell) | 5.0 |
| Total | 100.0 |

The primary detergency test was conducted using 4 weight percent of the polymer prepared in Example 14. The wash water had 110 ppm hardness with a Ca to Mg ratio of 2:1. The test was conducted at 93° F. and 80 rpm.

The L, a and b values of the swatches were measured before and after the swatches were washed and dried. From these values the ΔE values were calculated and listed in Table IX.

TABLE IX

| Primary detergency for dust sebum on cotton. | | |
| --- | --- | --- |
| Sample | ΔE | Ave ΔE |
| No polymer | 5.2 | 5.8 |
|  | 5.6 |  |
|  | 6.6 |  |
| Polymer of Example 15 | 7.7 | 6.9 |
|  | 6.9 |  |
|  | 6.0 |  |

The results in Table IX clearly show that the detergent composition containing the polymer prepared in Example 15 removed 20% more of the dust sebum stain from cotton than detergent compositions without the polymer. Thus, the polymers having pendant polysaccharide moieties have excellent primary detergency on dust sebum which is considered a very tough stain to remove especially from cotton articles.

While the invention has been described with particular reference to certain embodiments thereof, it will be understood that changes and modifications may be made by those of ordinary skill in the art within the scope and spirit of the following claims.

What is claimed is:

1. A water-soluble or water-dispersible polymer having pendant polysaccharide moieties, said polymer is prepared by reacting a functionalized polysaccharide moiety having the structure

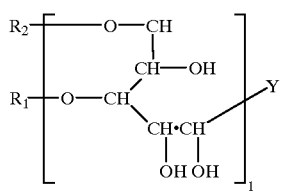

with at least one ethylenically unsaturated monomer to form a polysaccharide monomer which is polymerized to form a polymer having pendant polysaccharide moieties having the structure

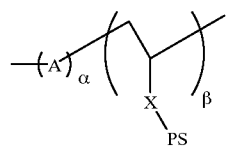

wherein PS is a polysaccharide; A is a comonomer repeating unit; I is an integer of 0 or 1; X is a linking group which is formed by reacting a functional group Y on the polysaccharide with a functional group on the ethylenically unsaturated monomer, X is covalently or ionically bonded to the polysaccharide and to a repeating unit which is derived from an ethylenically unsaturated monomer, and X is selected from the group consisting of amine, ester, amide, imide, urethane, urea, ether, epoxide, lactone and salts thereof; α is from 0 to 90 mole percent; β is from 10 to 100 mole percent; $R_1$ is H or is represented by the structure

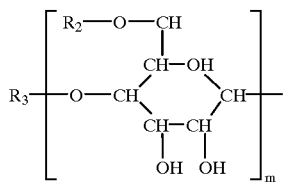

and R₂ is H or is represented by the structure

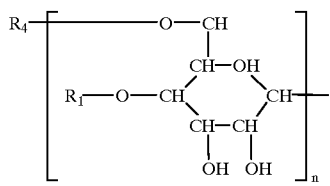

wherein $R_3$ and $R_4$ are independently selected from the group consisting of H, $C_1$–$C_{25}$ alkyl, $C_1$–$C_{25}$ alkaryl, $C_6$–$C_{25}$ aryl, —(CH₂—CHR₅—O)—, and combinations thereof, wherein $R_5$ is selected from the group consisting of H, methyl, ethyl, and benzyl; the sum of m+n is from 0 to about 100, provided that if I is equal to 0 then $R_1$ and $R_2$ are not both H.

2. A water-soluble or water-dispersible polymer having pendant polysaccharide moieties, said polymer is prepared by reacting a functionalized polysaccharide moiety having the structure

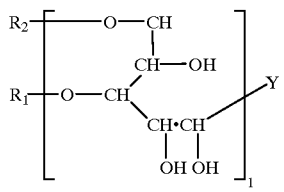

with a first polymer or first copolymer prepared by reacting at least one ethylenically unsaturated monomer and optionally a comonomer to form a polymer having pendant polysaccharide moieties having the structure

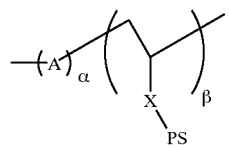

wherein PS is a polysaccharide; A is a comonomer repeating unit; I is an integer of 0 or 1; X is a linking group which is formed by reacting a functional group Y on the polysaccharide with a functional group on the ethylenically unsaturated monomer, X is covalently or ionically bonded to the polysaccharide and to a repeating unit which is derived from an ethylenically unsaturated monomer, and X is selected from the group consisting of amine, ester, amide, imide, urethane, urea, ether, epoxide, lactone and salts thereof; α is from 0 to 90 mole percent; β is about 10 to 100 mole percent; $R_1$ is H or is represented by the structure

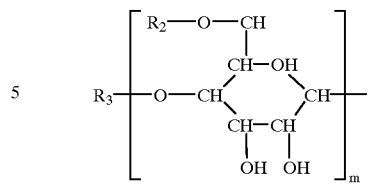

and $R_2$ is H or is represented by the structure

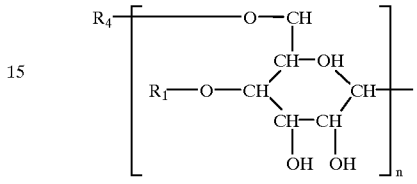

wherein $R_3$ and $R_4$ are independently selected from the group consisting of H, $C_1$–$C_{25}$ alkyl, $C_1$–$C_{25}$ alkaryl, $C_6$–$C_{25}$ aryl, —(CH₂—CHR₅—O)—, and combinations thereof, wherein $R_5$ is selected from the group consisting of H, methyl, ethyl, and benzyl; the sum of m+n is from 0 to about 100, provided that if I is equal to 0 then $R_1$ and $R_2$ are not both H.

3. A water-soluble or water-dispersible polymer having pendant polysaccharide moieties, said polymer is prepared by reacting a functionalized polysaccharide moiety having the structure

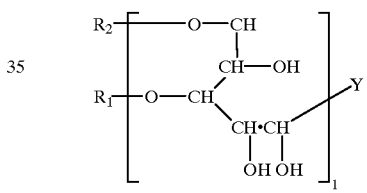

with a modified second polymer or modified second copolymer prepared by reacting at least one ethylenically unsaturated monomer and optionally a comonomer to form a polymer having pendant polysaccharide moieties, wherein the modified second polymer or second copolymer means that the second polymer or second copolymer is altered to introduce functional groups capable of reacting with the functionalized polysaccharide moiety, said polymer having pendant polysaccharide moieties has the structure

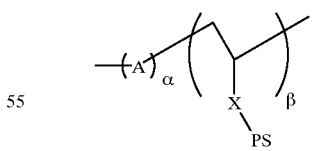

wherein PS is a polysaccharide; A is a comonomer repeating unit; I is an integer of 0 or 1; X is a linking group which is formed by reacting a functional group Y on the polysaccharide with a functional group on the ethylenically unsaturated monomer, X is covalently or ionically bonded to the polysaccharide and to a repeating unit which is derived from an ethylenically unsaturated monomer, and X is selected from the group consisting of amine, ester, amide, imide, urethane, urea, ether, epoxide, lactone and salts thereof; α is from 0 to 90 mole percent; β is from 10 to 100 mole percent; $R_1$ is H or is represented by the structure

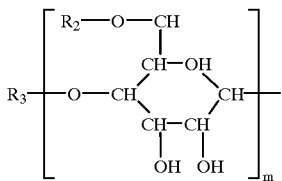

and $R_2$ is H or is represented by the structure

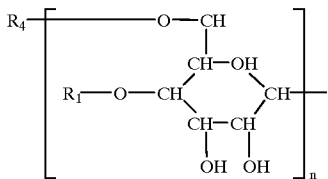

wherein $R_3$ and $R_4$ are independently selected from the group consisting of H, $C_1$–$C_{25}$ alkyl, $C_1$–$C_{25}$ alkaryl, $C_6$–$C_{25}$ aryl, —(CH$_2$—CHR$_5$—O)—, and combinations thereof, wherein $R_5$ is selected from the group consisting of H, methyl, ethyl, and benzyl; the sum of m+n is from 0 to about 100, provided that if I is equal to 0 then $R_1$ and $R_2$ are not both H.

4. The polymer according to claim 1 wherein the ethylenically unsaturated monomer is selected from the group consisting of anhydrides, vinyl esters, alkyl esters of acrylic and methacrylic acid, substituted or unsubstituted mono and dialkyl esters of unsaturated dicarboxylic acids, unsaturated carboxylic acids, vinyl aromatics, unsubstituted or substituted acrylamides, cyclic monomers, monomers containing alkoxlated side chains, sulfonated monomers, vinyl amide monomers, and combinations thereof.

5. The polymer according to claim 4 wherein the vinyl esters are selected from the group consisting of vinyl acetate, vinyl formate, vinyl propionate, vinyl butyrate, vinyl isobutyrate, vinyl valerate, vinyl 2-ethyl-hexanoate, vinyl isooctanoate, vinyl nonoate, vinyl decanoate, vinyl pivalate, and vinyl versatate.

6. The polymer according to claim 4 wherein the alkyl esters are selected from the group consisting of methyl acrylate, methyl methacrylate, ethyl acrylate, ethyl methacrylate, and butyl acrylate.

7. The polymer according to claim 4 wherein the substituted or unsubstituted mono and dialkyl esters of unsaturated dicarboxylic acids are selected from the group consisting of substituted and unsubstituted mono and dibutyl, mono and diethyl maleate esters, and the corresponding fumarates of such esters.

8. The polymer according to claim 4 wherein the unsaturated carboxylic acids are selected from the group consisting of crotonic acid, acrylic acid, methacrylic acid, fumaric acid, maleic acid, itaconic acid, and citraconic acid.

9. The polymer according to claim 4 wherein the vinyl amide monomers are selected from the group consisting of N-vinyl formamide and N-vinyl acetamide.

10. The polymer according to claim 4 wherein the ethylenically unsaturated monomer is selected from the group consisting of maleic anhydride, itaconic anhydride, acrylic acid, methacrylic acid, and 3-Isopropenyl-α,α-dimethylbenzyl isocyanate.

11. The polymer according to claim 1 wherein the comonomer is selected from the group consisting of vinyl esters, α-olefins, alkyl esters of acrylic and methacrylic acid, substituted or unsubstituted mono and dialkyl esters of unsaturated dicarboxylic acids, unsaturated carboxylic acids, vinyl aromatics, unsubstituted or substituted acrylamides, cyclic monomers, monomers containing alkoxlated side chains, sulfonated monomers, vinyl amide monomers, and combinations thereof.

12. The polymer according to claim 11 wherein the comonomer has $C_1$–$C_{25}$ alkyl side chains or alkoxylated side chains.

13. The polymer according to claim 11 wherein the comonomer is selected from the group consisting of ethylene, styrene and combinations thereof.

14. The polymer according to claim 1 wherein the functionalized polysaccharide is prepared from a saccharide which is selected from the group consisting of starches, hydrolyzed starches, lactose, maltose, maltodextrins, corn syrup solids, cellulose, hydrolyzed cellulose, dextran, hydrolyzed dextran, guar gum, hydrolyzed guar gum, locust bean gum, hydrolyzed locust bean gum, and combinations thereof.

15. The polymer according to claim 14 wherein the functionalized polysaccharide is selected from the group consisting of N-methyl glucamine, N-methyl lactamine, and N-methyl oligosaccharides.

16. The polymer according to claim 1 which is prepared by reacting N-methyl glucamine with 3-isopropenyl-α,α-dimethylbenzyl isocyanate (m-TMI) to form m-TMI-glucamine which is polymerized.

17. The polymer according to claim 2 which is prepared by reacting N-methyl glucamine with the styrene-maleic anhydride copolymer.

18. The polymer according to claim 3 which is prepared by polymerizing vinyl acetate to polyvinyl acetate which is hydrolyzed to polyvinyl alcohol which is reacted with gluconic acid.

19. The polymer according to claim 3 which is prepared by polymerizing N-vinyl formamide to poly(N-vinyl formamide) which is hydrolyzed to polyvinyl amine which is reacted with gluconic acid.

20. The polymer according to claim 3 which is prepared by polymerizing N-vinyl formamide to poly(N-vinyl formamide) which is hydrolyzed to polyvinyl amine which is reacted with glucose and hydrogenated.

21. The polymer according to claim 1 wherein α is from 0 to about 75 and β is from about 25 to 100.

22. The polymer according to claim 21 wherein α is from about 60 to about 40 and β is from about 40 to about 60.

23. A cleaning composition comprising a water-soluble or water-dispersible polymer having pendant polysaccharide moieties, said polymer is prepared by reacting a functionalized polysaccharide moiety having the structure

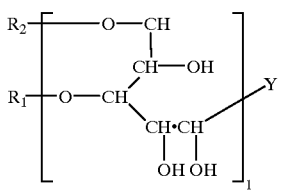

with at least one ethylenically unsaturated monomer to form a polysaccharide monomer which is polymerized to form a polymer having pendant polysaccharide moieties having the structure

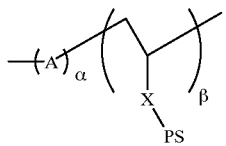

wherein PS is a polysaccharide; A is a comonomer repeating unit; I is an integer of 0 or 1; X is a linking group which is formed by reacting a functional group Y on the polysaccharide with a functional group on the ethylenically unsaturated monomer, X is covalently or ionically bonded to the polysaccharide and to a repeating unit which is derived from an ethylenically unsaturated monomer, and X is selected from the group consisting of amine, ester, amide, imide, urethane, urea, ether, epoxide, lactone and salts thereof; α is from 0 to 90 mole percent; β is from 10 to 100 mole percent; $R_1$ is H or is represented by the structure

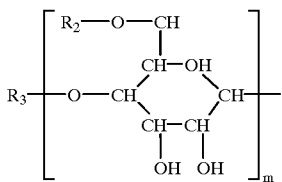

and $R_2$ is H or is represented by the structure

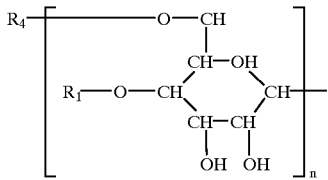

wherein $R_3$ and $R_4$ are independently selected from the group consisting of H, $C_1$–$C_{25}$ alkyl, $C_1$–$C_{25}$ alkaryl, $C_6$–$C_{25}$ aryl, —($CH_2$—$CHR_5$—O)—, and combinations thereof, wherein $R_1$ is selected from the group consisting of H, methyl, ethyl, and benzyl; the sum of m+n is from 0 to about 100, provided that if I is equal to 0 then $R_1$ and $R_2$ are not both H.

24. A cleaning composition comprising a water-soluble or water-dispersible polymer having pendant polysaccharide moieties, said polymer is prepared by reacting a functionalized polysaccharide moiety having the structure

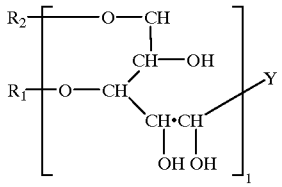

with a first polymer or first copolymer prepared by reacting at least one ethylenically unsaturated monomer and optionally a comonomer to form a polymer having pendant polysaccharide moieties having the structure

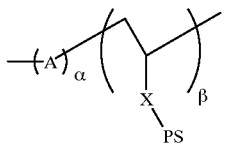

wherein PS is a polysaccharide; A is a comonomer repeating unit; I is an integer of 0 or 1; X is a linking group which is formed by reacting a functional group Y on the polysaccharide with a functional group on the ethylenically unsaturated monomer, X is covalently or ionically bonded to the polysaccharide and to a repeating unit which is derived from an ethylenically unsaturated monomer, and X is selected from the group consisting of amine, ester, amide, imide, urethane, urea, ether, epoxide, lactone and salts thereof; α is from 0 to 90 mole percent; β is from 10 to 100 mole percent; $R_1$ is H or is represented by the structure

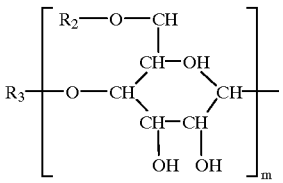

and $R_2$ is H or is represented by the structure

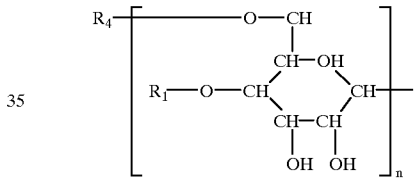

wherein $R_3$ and $R_4$ are independently selected from the group consisting of H, $C_1$–$C_{25}$ alkyl, $C_1$–$C_{25}$ alkaryl, $C_6$–$C_{25}$ aryl, —($CH_2$—$CHR_5$—O)—, and combinations thereof, wherein $R_5$ is selected from the group consisting of H, methyl, ethyl, and benzyl; the sum of m+n is from 0 to about 100, provided that if I is equal to 0 then $R_1$ and $R_2$ are not both H.

25. A cleaning composition comprising a water-soluble or water-dispersible polymer having pendant polysaccharide moieties, said polymer is prepared by reacting a functionalized polysaccharide moiety having the structure

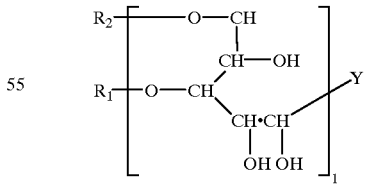

with a modified second polymer or modified second copolymer prepared by reacting at least one ethylenically unsaturated monomer and optionally a comonomer to form a polymer having pendant polysaccharide moieties, wherein the modified second polymer or second copolymer means that the second polymer or second copolymer is altered to introduce functional groups capable of reacting with the functionalized polysaccharide moiety, said polymer having pendant polysaccharide moieties has the structure

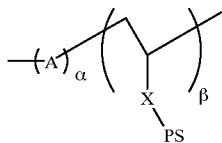

wherein PS is a polysaccharide; A is a comonomer repeating unit; I is an integer of 0 or 1; X is a linking group which is formed by reacting a functional group Y on the polysaccharide with a functional group on the ethylenically unsaturated monomer, X is covalently or ionically bonded to the polysaccharide and to a repeating unit which is derived from an ethylenically unsaturated monomer, and X is selected from the group consisting of amine, ester, amide, imide, urethane, urea, ether, epoxide, lactone and salts thereof; $\alpha$ is from 0 to 90 mole percent; $\beta$ is from 10 to 100 mole percent; $R_1$ is H or is represented by the structure

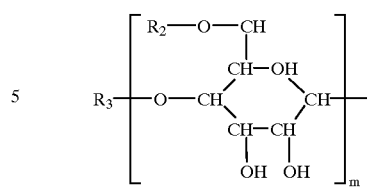

and $R_2$ is H or is represented by the structure

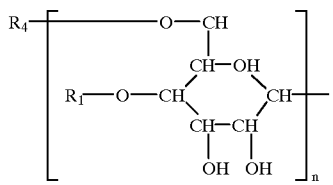

wherein $R_3$ and $R_4$ are independently selected from the group consisting of H, $C_1$–$C_{25}$ alkyl, $C_1$–$C_{25}$ alkaryl, $C_6$–$C_{25}$ aryl, —($CH_2$—$CHR_5$—O)—, and combinations thereof, wherein $R_5$ is selected from the group consisting of H, methyl, ethyl, and benzyl; the sum of m+n is from 0 to about 100, provided that if I is equal to 0 then $R_1$ and $R_2$ are not both H.

* * * * *